United States Patent

Hostetler

[11] Patent Number: 5,975,824
[45] Date of Patent: Nov. 2, 1999

[54] BALE LIFTING AND LOAD DUMPING APPARATUS

[76] Inventor: Dewey Hostetler, R.R. 2, Box 77, Harper, Kans. 67058

[21] Appl. No.: 09/231,896

[22] Filed: Jan. 14, 1999

[51] Int. Cl.$^6$ ........................................................ B60P 1/00
[52] U.S. Cl. .......................................... 414/24.5; 298/1 A
[58] Field of Search .................................. 414/24.5, 498, 414/546; 298/1 A, 10; 296/184

[56] References Cited

U.S. PATENT DOCUMENTS

| | | | |
|---|---|---|---|
| 4,044,963 | 8/1977 | Hostetler | 242/54 R |
| 4,564,325 | 1/1986 | Ackerman | 414/24.5 |
| 4,594,041 | 6/1986 | Hostetler | 414/24.5 |
| 5,383,714 | 1/1995 | Hunter | 414/24.5 |
| 5,882,085 | 3/1999 | Pekarek | 414/24.5 |
| 5,899,652 | 5/1999 | Graham | 414/24.5 |

*Primary Examiner*—Christopher P. Ellis
*Assistant Examiner*—Gregory A. Morse
*Attorney, Agent, or Firm*—Kenneth Jack

[57] ABSTRACT

An apparatus for bale lifting and load dumping, including a support frame; a truck bed overlying the support frame, the rearward end of the truck bed being pivotally attached to the rearward end of the support frame; a lift arm articulating beam, the lift arm articulating beam being pivotally attached to the rearward end of the truck bed; a pair of bale lifting arms extending substantially perpendicularly from the lift arm articulating beam; an actuator having an alternately extendable and retractable shaft, the actuator having a first end and a second end, the first end of the actuator being pivotally attached to the support frame; and a linkage interconnecting the second end of the actuator and the lift arm articulating beam; the connection of the linkage to the lift arm articulating beam being positioned so that upon alternate restraint of pivotal motion of the truck bed about the pivotal attachment to the support frame, and restraint of pivotal motion of the lift arm articulating beam about the pivotal attachment to the truck bed, operation of the actuator alternately pivots the lift arm articulating beam about the pivotal attachment to the truck bed, and pivots the truck bed about the pivotal attachment to the support frame.

11 Claims, 7 Drawing Sheets

BALE LIFTING AND LOAD DUMPING APPARATUS

FIELD OF THE INVENTION

The inventive apparatus disclosed herein relates to trucks. More particularly, said invention relates to trucks whose load carrying truck bed is adapted for dumping cargo rearwardly upon upward inclination. Further, the present invention relates to trucks whose beds are adapted for lifting, loading, and off loading large cylindrical bales of hay or straw.

BACKGROUND OF THE INVENTION

Where a truck is utilized in an agricultural setting, it is desirable that the truck be capable of performing multiple functions or tasks. For example, it is common for such trucks to be equipped with fixtures adapting the forward bumper for attachment of a snow or dirt moving blade. As another example, agricultural trucks are commonly equipped with a fifth wheel trailer hitch or a rear bumper trailer hitch enabling the truck to pull various carts and trailers. As a further example, a common adaptation of an agricultural truck allows its load bearing bed to upwardly pivot, allowing the truck to function as a dump truck. Typically, hydraulic rams are installed within the bed supporting frames of such trucks, such rams providing the motive force for alternately inclining and leveling the truck's load bearing bed. Another common adaptation of an agricultural truck includes hydraulically powered bale lifting arms for conveniently raising large hay bales onto the truck bed and for off loading hay bales therefrom. Examples of such adaptation are disclosed in U.S. Pat. No. 4,594,041 issued Jun. 10, 1986, to Hostetler; U.S. Pat. No. 4,564,325 issued Jan. 14, 1986, to Ackerman; and U.S. Pat. No. 4,044,963 issued Aug. 30, 1977, to Hostetler. As with common dump bed adaptations, adaptations of agricultural trucks for bale lifting typically incorporate hydraulic rams to provide the motive force for bale lifting.

While it is desirable that an agricultural truck be dually capable of functioning as a dump truck and as a bale lifter, a farm truck operator may hesitate to equip the truck to perform both functions due to the mechanical complexity of equipping the truck both with a set of bed lifting rams and a set of bale lifting rams, and due to the expense of installing duplicate sets of rams. The instant inventive bale lifting and load dumping apparatus solves the above described problems of mechanical complexity and additional expense by providing apparatus allowing a single set of hydraulic rams to alternately perform a truck bed inclining function and a bale lifting function.

BRIEF SUMMARY OF THE INVENTION

The instant inventive bale lifting and load dumping apparatus preferably comprises and understructure consisting of a rectangular box frame fabricated from C-channel and tubular steel. Preferably, the box frame is fitted so that it may overlie and be fixedly bolted to or welded upon the rear chassis of a farm truck, the box frame and the chassis together forming a support frame. Suitably, fabrication of a separate box frame may be omitted, utilizing a rear truck chassis as the sole underlying support frame member of the instant inventive apparatus.

The truck bed floor of the instant inventive apparatus preferably directly overlies and, upon horizontal orientation of the floor, the lower surface of the floor preferably rests in direct contact with the upper surface of the box frame. A rear wall of the truck bed preferably is pivotally attached by means of pin and clevice joints to the rearward end of the box frame, the points of pivotal attachment preferably being positioned at the left and right sides of the rear of the box frame. Preferably, the elevations of the said points of pivotal attachment of the rearward wall of the truck bed lie below the box frame, establishing triangulation between a hydraulic ram supporting cross member of the box frame, the rearward floor level of the truck bed, and between said point of pivotal attachment. Preferably, such lowering of the point of pivotal attachment is achieved through a downward extension of the rear wall of the truck bed, and through parallel downward extensions of pivot supporting bars, such bars extending from the rearward ends of the left and right sides of the box frame. The pin and device joints linking the bed and the frame are preferably mounted at the lower ends of such bars.

Preferably, a lift arm articulating beam fabricated from steel square tubing is pivotally attached to the rearwardly facing surface of the wall extending downward from the rearward edge of the floor of the truck bed, such pivotal attachment preferably comprising a pair of pin and device joints. Such pin and device joints preferably enable the lift arm articulating beam to pivot from a first position, wherein its forward face is in contact with the rearwardly facing surface of the rear wall of the truck bed, and wherein its upper surface lies in substantially the same plane as the upper surface of the floor, to a second position wherein the forward facing surface is reoriented rearwardly, and wherein the upwardly facing surface is reoriented downwardly.

Preferably, a pair of laterally oriented two way hydraulic rams are mounted within the interior bore of the lift arm articulating beam, such hydraulic rams sharing a common base fixedly and centrally mounted withing the cross beam, the shafts of such hydraulic rams respectively extending leftwardly and rightwardly for controlling leftward and rightward extension and retraction of left and right telescoping sleeves, such sleeves being slidably mounted over the left and right ends of the lift arm articulating beam. The left and right telescoping sleeves are preferably fabricated from steel square tubing. Also, preferably, the outer ends of the left and right telescoping sleeves are closed, providing surfaces for fixed attachments of the outer ends of the extension shafts of the pair of hydraulic rams mounted within the bore of the lift arm articulating beam.

Preferably, a left bale lifting arm is fixedly welded to the upper surface of the left telescoping sleeve, its point of attachment being positioned at the outer end of the telescoping sleeve. Similarly, a right bale lifting arm is fixedly welded to the outer end of the upper surface of the right telescoping sleeve. Preferably, the left and right bale lifting arms are oriented so that upon upward orientation of the upper surface of the lift arm articulating beam, the lower surfaces of the left and right bale lifting arms overlie and are in contact with the upper surface of the floor. With the bale lifting arms so positioned, actuation of the hydraulic rams mounted within the interior bore of the lift arm articulating beam causes the bale lifting arms to respectively slide laterally leftwardly and rightwardly across the upwardly facing surface of the floor of the truck bed. Through such lateral positioning of the left and right bale lifting arms, their outwardly facing surfaces may align with the left and right edges of the floor, configuring the left and right bale lifting arms for service as left and right load retaining rails.

Preferably, upon pivotal orientation of the left and right bale lifting arms so that their lower surfaces are in contact with the upper surface of the floor, such arms will not extend the full longitudinal length of the truck bed floor. Thus, where the left and right bale lifting arms are respectively positioned at the far left and right sides of the floor to function as load retaining rails, such rails form incomplete barriers. In order to fill the railing gaps, fixed rails are preferably installed upon the left and right sides of the floor, the fixed rails spanning between the forward end of the floor and the points of furthest forward extension of the forwardly articulated left and right bale lifting arms. Preferably, the rearward ends of the left and right fixed rails are undercut, forming left and right tab receiving slots. Also preferably, the forward ends of the left and right bale lifting arms have tabs fixedly attached thereto and extending forwardly therefrom, such tabs being positioned so that they may extend into the left and right tab receiving slots upon lateral positioning of the left and right bale lifting arms for service as load retaining rails. When the left and right tabs of the left and right bale lifting arms are slidably positioned beneath the left and right tab receiving slots, the left and right bale lifting arms are locked in place in their forwardly articulated positions.

Preferably, a pair of longitudinally oriented two way hydraulic rams are mounted between a cross member of the box frame and the forwardly facing surface of the lift arm articulating beam, the ends of the extension shafts of said hydraulic rams preferably being linked to such forwardly facing surface by a pair of bars having pin and device joints at their ends. Upon engagement of the tabs at the forward ends of the left and right bale lifting arms with the left and right tab receiving slots, operation of the longitudinally oriented pair of hydraulic rams to extend their shafts causes the entire truck bed to incline upward, pivoting about its rearward pivotal attachments, the tab and slot engagements of the left and right bale lifting arms preventing such arms and the lift arm articulating beam from pivoting about their pivotal attachment to the truck bed.

Upon similar actuation of the longitudinally oriented pair of hydraulic rams while the tabs extending from the ends of the bale lifting arms are disengaged from the tab receiving slots, the bale lifting arms and the lift arm articulating beam pivot about their pivotal attachments, causing the bale lifting arms to articulate rearwardly.

Because it is preferable to restrain pivotal motion of the truck bed while the bale lifting arms undergo rearward articulation, it is desirable that disengagement of the tabs at the ends of the bale lifting arms from their tab receiving slots automatically engage a latch interlinking the forward end of the truck bed and the forward end of the support frame. Upon full articulation of the bale lifting arms, the pair of hydraulic rams mounted within the bore of the lift arm articulating beam may be operated to cause the bale lifting arms to move in the manner of a caliper, grasping a cylindrical hay bale. Upon securing a hay bale between the bale lifting arms, the longitudinally oriented pair of hydraulic rams may be actuated to lift the hay bale from the ground onto the upper surface of the floor of the truck bed.

While it is preferable that a pair of longitudinally oriented hydraulic rams be utilized for articulating the bale lifting arms and for alternately inclining and leveling the floor of the truck bed, a single centrally located hydraulic ram may be suitably utilized. Because agricultural trucks and farm implements are commonly equipped with auxiliary hydraulic power systems, utilization of hydraulic rams to provide the motive force for articulation of the bale lifting arms, for inclining and leveling the truck bed, and for lateral positioning of the bale lifting arms is preferable. Pneumatic rams may be suitably utilized in place of hydraulic rams; however, a pneumatic system is comparatively undesirable because compressible air which serves as a power transfer medium also acts as a spring. Also suitably, electric motor driven or hydraulic motor driven ball screw actuators may be utilized in place of the hydraulic rams. Also suitably, electric motor driven or hydraulic motor driven roller screw actuators may be utilized. However, roller and ball screw actuators are comparatively undesirable due to excessive cost of such systems, and due to excessive wear of their mechanical parts.

Accordingly, it is an object of the present invention to provide a bale lifting and load dumping apparatus which utilizes shaft extending and retracting actuators to perform dual functions of alternately inclining and leveling the floor of a truck bed, and articulating bale lifting arms.

Other and further objects, benefits, and advantages of the present invention will become known to those skilled in the art upon review of the Detailed Description which follows and upon review of the appended drawings.

DETAILED DESCRIPTION OF THE PREFERRED EMBODIMENT

Figure 2:
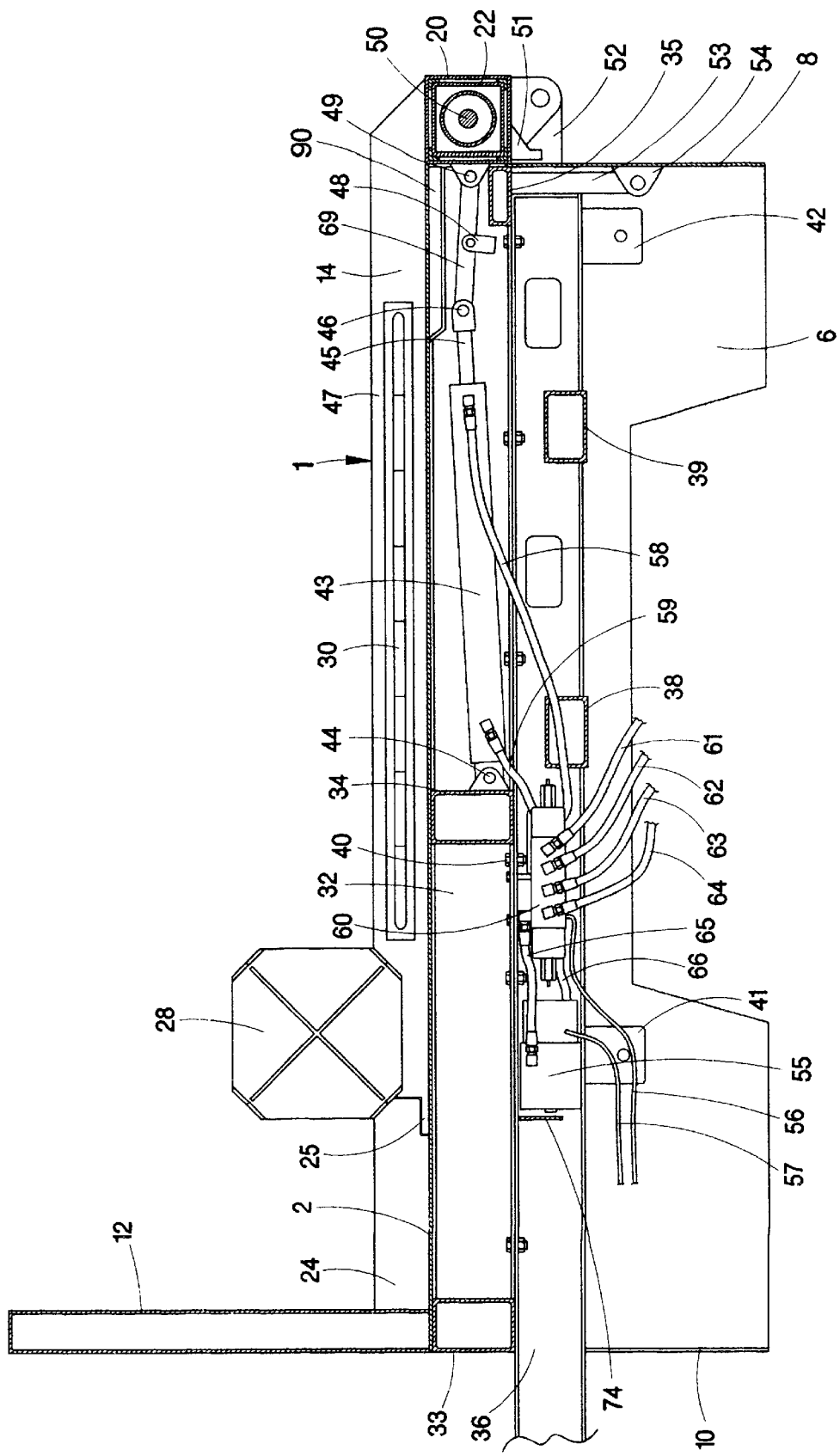
FIG. 2 is a longitudinal sectional view of the apparatus depicted in FIG. 1.
Figure 3:
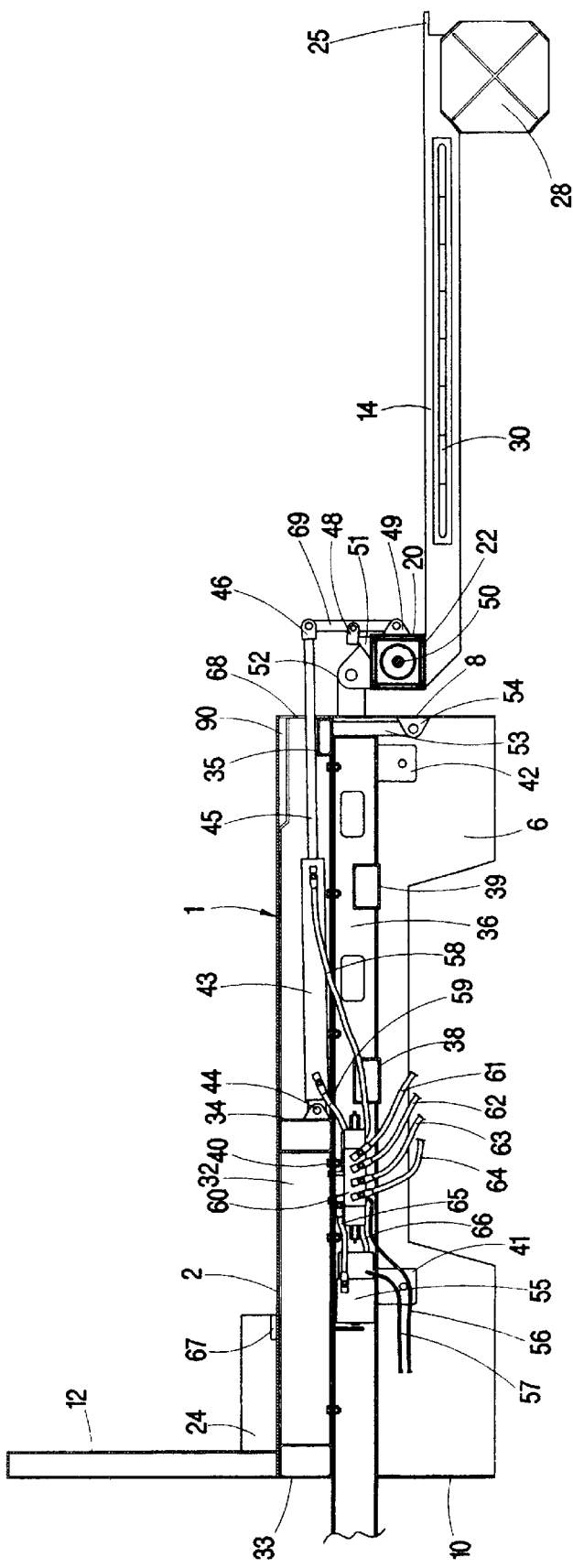
FIG. 3 is an alternate longitudinal view of the apparatus depicted in FIG. 1, said view depicting bale lifting arms extended.
Figure 4:
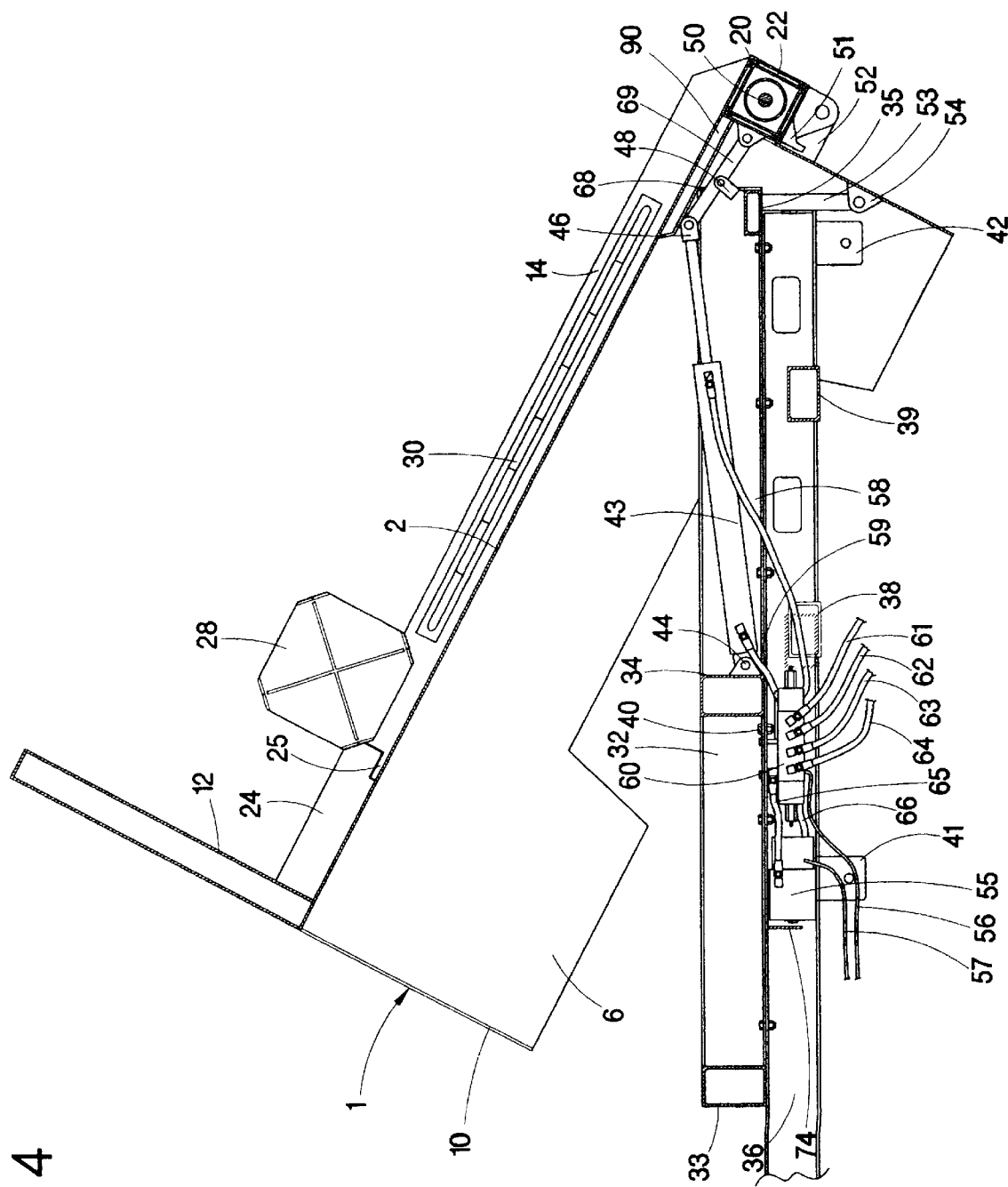
FIG. 4 is an alternate longitudinal sectional view of the apparatus depicted in FIG. 1, the view depicting inclination of the truck bed.
Figure 5:
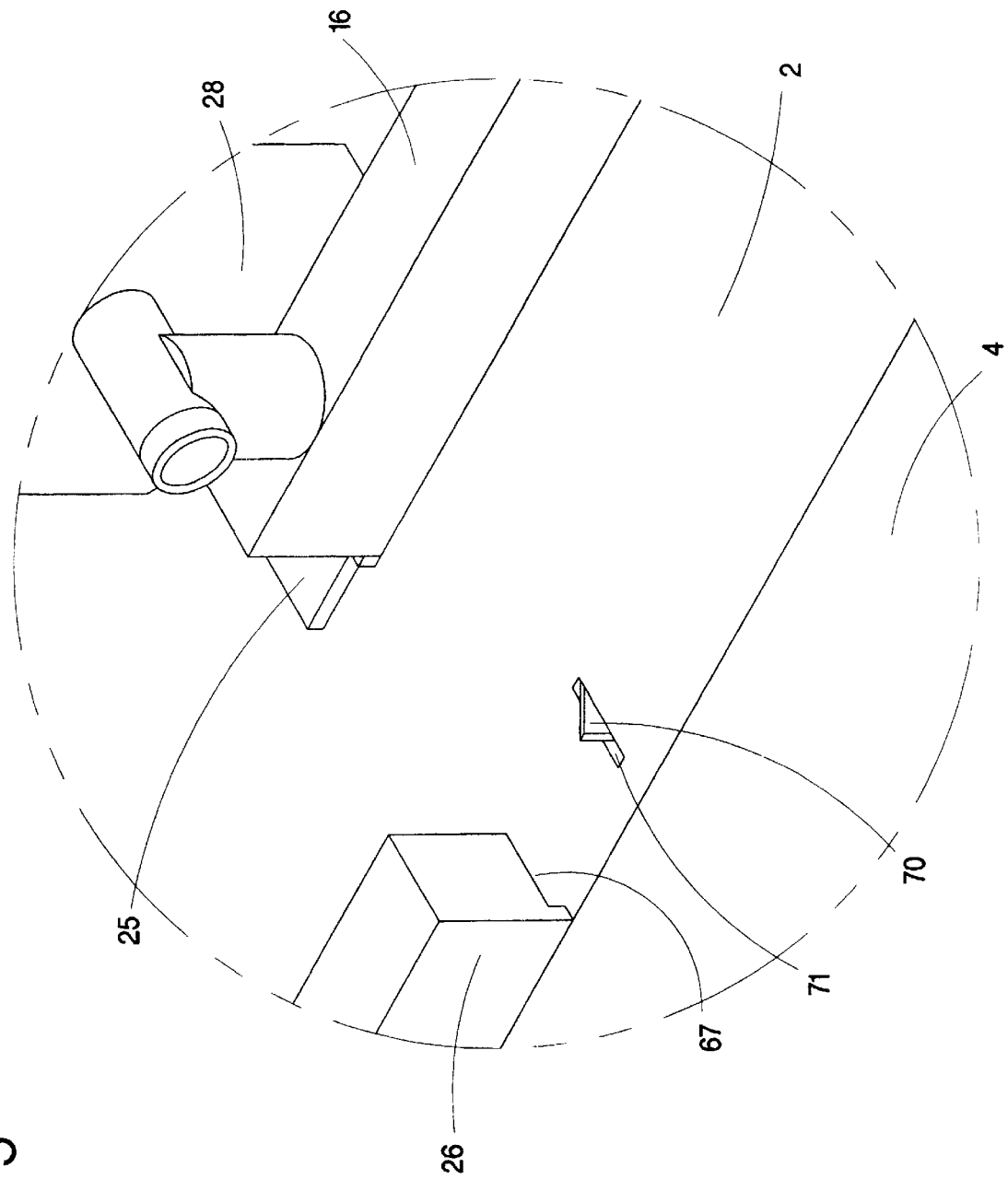
FIG. 5 is a magnified view of a portion of the apparatus depicted in FIG. 1.

Referring now to the drawings, and in particular, simultaneously to FIGS. 2, 3, and 4, all structural elements there depicted as being within the rightward view of the section, with the exceptions of the hydraulic pump and reservoir assembly 55, electric lines 56 and 57, solenoid actuated valve box 60 and hydraulic flow lines 61, 62, 63, 64, 65, and 66, would be mirrored in a leftward facing sectional view (not depicted).

A major structural element of the present inventive apparatus for bale lifting and load dumping is a truck bed 1 which comprises a load bearing floor 2, a left side wall 4 extending downward from the left side of the load bearing floor 2, a right side wall 6 extending downward from the right side of the load bearing floor 2, a rear wall 8 extending downward from the rear edge of the load bearing floor 2, a forward wall 10 extending downward from the forward edge of the load bearing floor 2, a partial left side rail 26, a partial side rail 24, and a truck cab protecting wall 12 extending upwardly from the forward end of the load bearing floor 2. All of the above described elements of the truck bed 2, 4, 6, 8, 10, 12, 24, and 26, are preferably composed of steel and are rigidly attached at their junctures by means of heat fusion welding.

Figure 6:
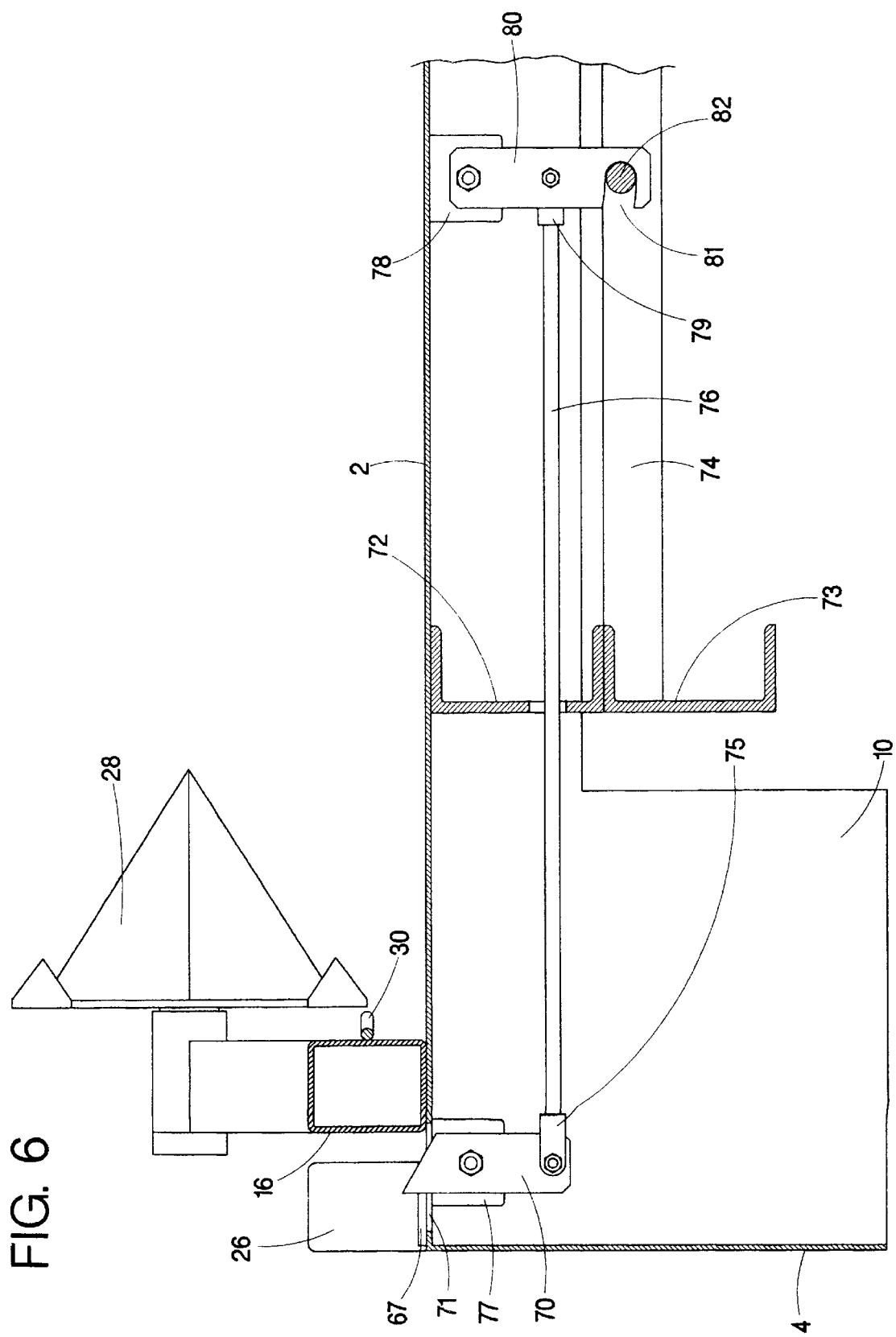
FIG. 6 is a lateral sectional view of the apparatus depicted in FIG. 1.

Referring to FIG. 2, a second major structural element of the inventive bale lifting and load dumping apparatus is a support frame preferably comprising a box frame 32 and a truck chassis 36, the truck chassis 36 having leaf spring attachment brackets 41 and 42 fixedly attached thereto and extending downwardly therefrom, the box frame 32 preferably being fixedly attached by bolts 40 to the truck chassis 36. Referring to FIG. 6, the box frame and the underlying truck chassis preferably comprise steel C-channel longitudinally extending members 72 and 73; and referring simultaneously to FIG. 2, such members 72 and 73 are preferably rigidly supported by tubular steel cross braces 33, 34, 35, 38, and 39. Alternately, the support frame underlying the truck bed 1 may be suitably configured to include only the truck chassis 36, omitting the box frame 32.

Referring further to FIG. 2, triangulation bars 53 are preferably fixedly welded to the rearward ends of the truck chassis 36 and box frame 32, the triangulation bars 53 extending downwardly to an elevation below the lower surface of the truck chassis 36. The lower ends of the triangulation bars 53 are preferably pivotally attached to the forwardly facing surface of the rear wall 8 by means of a pin and device joints 54.

Figure 1:
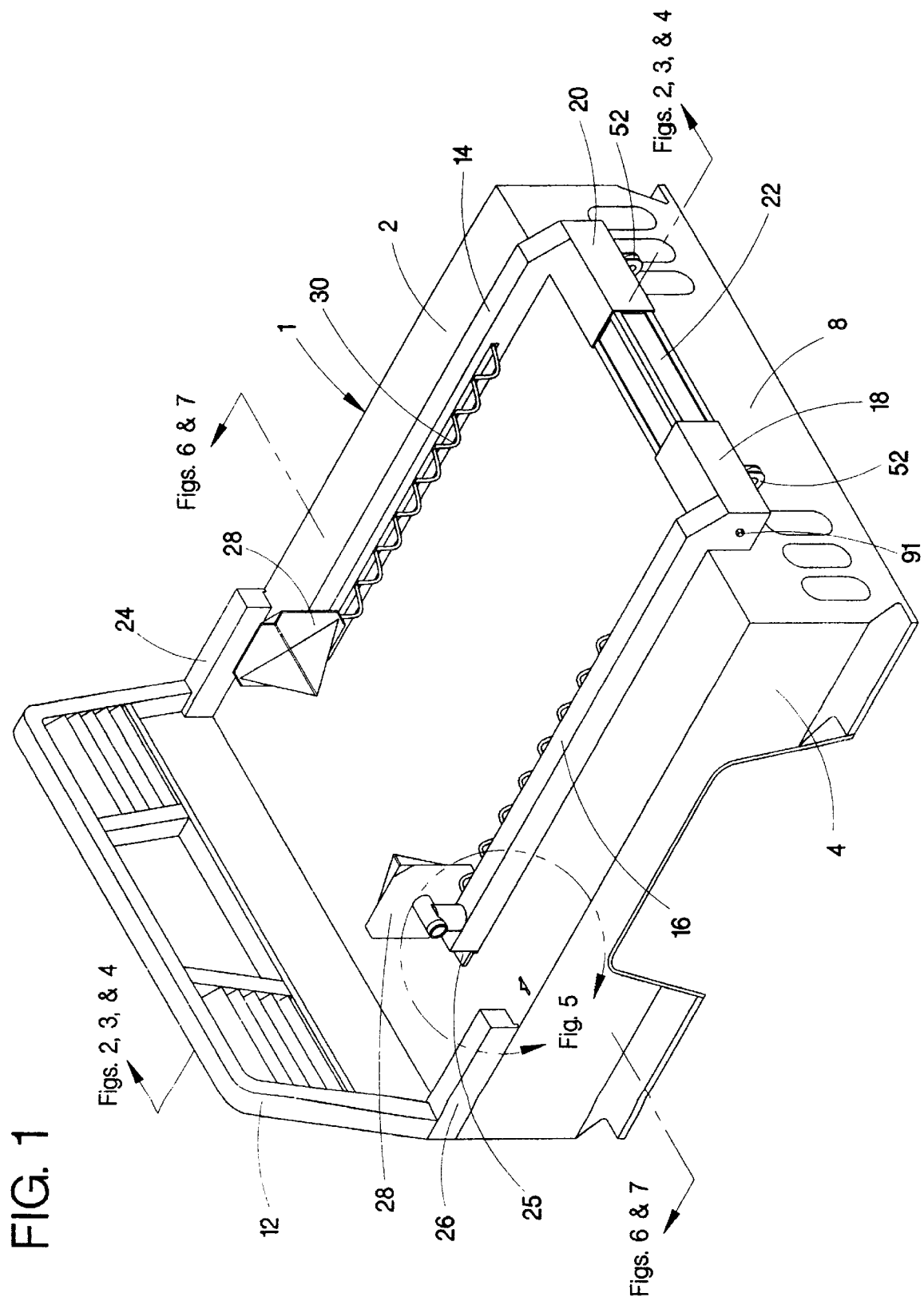
FIG. 1 is an isometric view of the present inventive apparatus for bale lifting and load dumping.

Referring simultaneously to FIGS. 1 and 2, a hollow bored lift arm articulating beam 22 is preferably pivotally attached to the rearwardly facing surface of the rear wall 8 by means of pin and clevice joints 52, such joints allowing the lift arm articulation beam 22 to move pivotally from a first position wherein its upper surface lies in a plane common with the upper surface of the load bearing floor 2, to a second position wherein said upper surface of the lift arm articulating beam 22 is downwardly oriented.

Referring further to FIGS. 1 and 2, left and right telescoping sleeves 18 and 20 are preferably slidably mounted over the opposing ends of the lift arm articulating beam 22, the telescoping sleeves 18 and 20 being laterally positionable by a pair of internally mounted hydraulic rams 50, the internally mounted hydraulic ram 50 biasing in opposite directions between a fixed internal central mounting post (not depicted) and the outwardly facing walls of the telescoping sleeves 18 and 20, the ends of the extension arms of the hydraulic rams 50 being fixedly attached to said outwardly facing walls by means of bolts 91.

Referring further to FIGS. 1 and 2, left and right bale lifting arms 16 and 14 are preferably fixedly mounted upon the upper surfaces of the telescoping sleeves 18 and 20, the bale lifting arms 16 and 14 preferably being positioned and oriented so that upon pivotal motion of the lift arm articulating beam 22 upwardly orienting its upper surface, the lower surfaces of the left and right bale lifting arms 16 and 14 lie flush against the upper surface of the load bearing floor 2. Referring simultaneously to FIGS. 1, 2, 6 and 7, while the bale lifting arms 16 and 14 are so oriented, hydraulic rams 50 may be actuated to outwardly drive the telescoping sleeves 18 and 20, such sleeves carrying outwardly the bale lifting arms 16 and 14, the lower surfaces of the bale lifting arms 16 and 14 sliding respectively leftwardly and rightwardly along the upper surface of the load bearing floor 2. Such leftward and rightward sliding motion of the bale lifting arms 16 and 14 may continue until tabs 25 fixedly attached to the outer ends of the bale lifting arms 16 and 14, enter tab receiving slots 67 underlying the partial left side rail 26 and the partial right side rail 24. Upon entry of the tabs 25 within slots 67, further outward slidable motion of the bale lifting arms 16 and 14 is restrained, such arms in such positions serving as rearward continuations of the partial left and right side rails 26 and 24. While tabs 25 are positioned within slots 67, pivotal motion of the lift arm articulating beam 22 about the pin and device joints 52 is similarly restrained. Preferably, referring to FIG. 1, the inwardly facing surfaces of the left and right bale lifting arms 16 and 14 have teeth 30 attached thereto for grasping large cylindrical bales of hay or straw. It is also preferable to rotatably mount a pair of inwardly facing spikes 28 upon the outer ends of the bale lifting arms 16 and 14 for securely grasping such cylindrical bales.

Referring to FIG. 2, a linkage preferably extends forwardly from the forward facing surface of the lift arm articulating beam 22, the linkage preferably comprising a pair of bars 69, the rearward ends of the bars 69 preferably being pivotally attached to said forward facing surface by means of pin and device joints 49. Referring simultaneously to FIGS. 2 and 3, the bars 69 and the pin and device joints 49 preferably extend forwardly through apertures 68 extending through the rear wall of the truck bed 1. Referring further to FIG. 2, an actuator capable of alternately extending and retracting a shaft is preferably mounted between the rearwardly facing surface of cross beam 34 and the forward ends of bars 69, such actuator preferably comprising a pair of hydraulic rams 43, the base of each hydraulic ram 43 preferably being pivotally attached to the cross beam 34 by means of a pin and clevice joint 44, and the extendable and retractable shafts 45 of the hydraulic rams 43 preferably being pivotally attached to bar 69 by means of pin and clevice joints 46.

While utilization of paired hydraulic rams 43 is preferred, a single centrally mounted hydraulic ram may be suitably utilized. Also suitably, pneumatic rams may be utilized in place of the hydraulic rams 43; however, pneumatic rams are comparatively undesirable due to their tendency to function as a springs while moving or actuating other elements. Roller screw actuators and ball screw actuators may similarly be suitably utilized in place of the hydraulic rams 43; however, such actuators are comparatively undesirable due to additional expense of equipment and excessive mechanical wear and tear.

Referring simultaneously to FIGS. 2, 3, and 4, while tabs 25 are positioned within tab receiving slots 67, the hydraulic rams 43 may be actuated to rearwardly extend shafts 45. Upon such rearward extension of shafts 45, linkage bars 69 pivot clockwise about their pin and clevice joints 49 until the upper surfaces of pin and clevice joints 46 come into contact with slide rails 90. Upon further extension of shafts 45, the truck bed 1 inclines upward, pivoting clockwise about pin and device joints 54. Such pivoting motion of the truck bed 1 allows the truck bed to rearwardly dump material such as rock or gravel loaded onto the upper surface of the truck bed floor 2. Retraction of shafts 45 repositions the truck bed 1 in its normal horizontal position.

Referring simultaneously to FIGS. 1, 2, and 3, upon operation of hydraulic rams 50 to draw bale lifting arms 16 and 14 inwardly, withdrawing tabs 25 from slots 67, tabs 25 will no longer restrain pivoting motion of the lift arm articulating beam 22 about pin and clevice joints 52. Where such pivotal motion remains unrestrained, actuation of hydraulic rams 43 to rearwardly extend shafts 45 causes bars 69 to pivot clockwise about their pin and device joints 49 until the upper surfaces of pin and device joints 46 come into contact with slide tracks 90. Upon further extension of shafts 45, pin and clevice joints 46 further slide along slide tracks 69, driving linkage bars 69 rearwardly, and pivoting the lift arm articulating beam 22 about pin and device joint 52. Upon continued rearward extensions of the shafts 45, the pin and clevice joints 46 and the bars 69, "U" shaped catches 48 engage pawls 51, allowing the bars 69 to serve as lever arms for further pivoting the lift arm articulating beam 22 about pin and clevice joints 52.

Referring simultaneously to FIGS. 1 and 3, upon full rearward articulation of the bale lifting arms 16 and 14, situating such arms upon either side of a cylindrical bale of hay or straw (not depicted), hydraulic rams 50 may be actuated to draw the bale lifting arms 16 and 14 toward each other pressing the bale of hay there between. While such bale of hay is pressed between the bale lifting arms 16 and 14, hydraulic rams 43 may be actuated to retract shafts 45, causing the lift arm articulating beam 22 and the bale lifting arms 16 and 14 to pivot counterclockwise about pin and device joints 52. Referring simultaneously to FIGS. 2, 3, 6 and 7, in order to prevent the load bearing bale lifting arms 16 and 14 from acting as lever arms upwardly tilting the truck bed 1, it is preferable to provide means for engaging the forward end of the truck bed 1 with the forward end of the support frame. Such means preferably comprises a hook plate 80 having a pin receiving notch 81, a pivot flange 78, a hook engaging pin 82, and a cross beam 74; the hook plate tying the forward end of the truck bed to the forward end of the support frame, preventing the truck bed from inclining upward upon retraction of shafts 45, pivoting the bale lifting arms 16 and 14 counter-clockwise, raising the bale of hay or straw over the truck bed 1.

Figure 7:
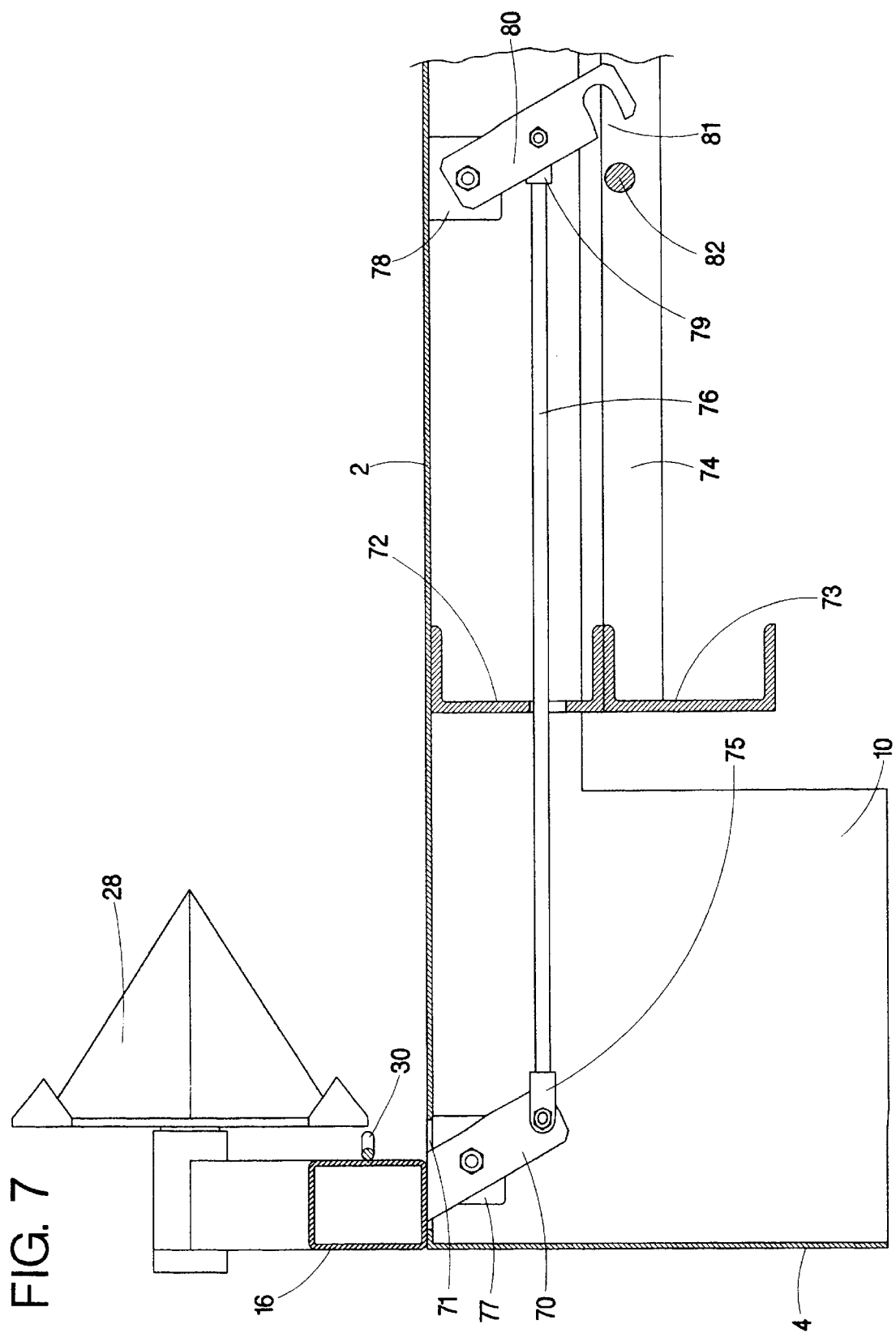
FIG. 7 is an alternate lateral sectional view of the apparatus depicted in FIG. 1.

Referring simultaneously to FIGS. 6 and 7, lateral slidable motion of the bale lifting arm 16 to align with the left partial side rail 26 causes the hook plate 80 to automatically disengage from the hook pin 82. Referring simultaneously to FIGS. 1, 6 and 7, upon entry of tab 25 within slot 67, such automatic disengagement results from pressure exerted by the left bale lifting arm 16 upon an angled surface of a pivot arm 70, the pivot arm 70 extending upwardly through a trip plate slot 71 within the floor 2. Counter-clockwise pivotal motion of the pivot arm 70, with respect to a pivot flange 77 upon which it is pivotally mounted, drives rightwardly a disengagement bar 76, the disengagement bar having pivotal mounts 75 and 79 interlinking the pivot arm 70 and the hook plate 80. Referring simultaneously to FIGS. 2 and 6 where the truck bed 1 is horizontally oriented and where the bale lifting arms 16 and 14 are slidably moved inwardly, the pivot arm 70 and the hook plate 80 automatically swing to a perpendicularly downward orientation, causing the hook plate 80 to automatically re-engage the hook engaging pin 82.

Referring to FIG. 2, an hydraulic power system may be conveniently installed within an open space within the truck chassis 36, such power system preferably comprising a hydraulic fluid reservoir, electric motor, and pump assembly 55, and a valve box 60 housing electric solenoid actuated valves, electric power being supplied to the electric motor by electric line 57 and electric power being supplied to the electric solenoids by electric control line 56. Hydraulic lines 61, 62, 63, 64, 65, 66, 58 and 59 comprise a network providing hydraulic fluid flow to the hydraulic rams 43, the hydraulic rams 50, and to the hydraulic pump, motor, and reservoir and assembly 55.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An apparatus for bale lifting and load dumping, the apparatus comprising:

(a) a support frame having a forward end and a rearward end;
   (b) a truck bed overlying the support frame, the truck bed having a forward and a rearward end, the rearward end of the truck bed being pivotally attached to the rearward end of the support frame;
   (c) a lift arm articulating beam, the lift arm articulating beam being pivotally attached to the rearward end of the truck bed;
   (d) a pair of bale lifting arms extending substantially perpendicularly from the lift arm articulating beam;
   (e) an actuator having an alternately extendable and retractable shaft, the actuator having a first end and a second end, the first end of the actuator being attached to the support frame; and,
   (f) a linkage interconnecting the second end of the actuator and the lift arm articulating beam;

the connection of the linkage to the lift arm articulating beam being positioned so that upon alternate restraint of pivotal motion of the truck bed about the pivotal attachment to the support frame, and restraint of pivotal motion of the lift arm articulating beam about the pivotal attachment to the truck bed, operation of the actuator alternately pivots the lift arm articulating beam about the pivotal attachment to the truck bed, and pivots the truck bed about the pivotal attachment to the support frame.

2. The apparatus of claim 1 further comprising means for restraining pivotal motion of the lift arm articulating beam about the pivotal attachment to the truck bed.

3. The apparatus of claim 2 further comprising means for restraining pivotal motion of the truck bed about the pivotal attachment to the support frame.

4. The apparatus of claim 3 wherein the means for restraining pivotal motion of the lift arm articulating beam comprises a first latch capable of alternately engaging the bale lifting arms with the truck bed and disengaging the bale lifting arms from the truck bed.

5. The apparatus of claim 4 wherein the means for restraining pivotal motion of the truck bed comprises a second latch capable of alternately engaging the truck bed with the support frame at a point forward of the pivotal attachment of the truck bed to the support frame, and disengaging the truck bed from the support frame at said point.

6. The apparatus of claim 5 further comprising means for alternately automatically engaging the first latch upon disengagement of the second latch and automatically engaging the second latch upon disengagement of the first latch.

7. The apparatus of claim 1 wherein the actuator is selected from the group of hydraulic rams, pneumatic rams, roller screw actuators, or ball screw actuators.

8. The apparatus of claim 1 wherein the actuator comprises a first pair of hydraulic rams, and wherein the linkage comprises a pair of bars, each bar having a first end and a second end, the first end of each bar being pivotally attached to one of the hydraulic rams among the first pair of hydraulic rams, the second end of each bar being pivotally attached to the lift arm articulating beam.

9. The apparatus of claim 8 wherein the bale lifting arms are laterally slidably positionable along the lift arm articulating beam, and further comprising a second pair of hydraulic rams capable of slidably positioning the bale lifting arms, the second pair of hydraulic rams biasing in opposite directions between the bale lifting arms and a fixed mount centrally located upon the lift arm articulating beam.

10. The apparatus of claim 9 further comprising a pair of partial side rails fixedly attached to and extending upwardly from the truck bed, each partial side rail having a tab receiving slot; and further comprising a pair of tabs, each tab being fixedly attached to one of the bale lifting arms among the pair of bale lifting arms, the tabs being, through selective operation of the first and second pairs of hydraulic rams, slidably positionable within tab receiving slots for restraining pivotal motion of the lift arm articulating beam about the pivotal attachment to the truck bed.

11. The apparatus of claim 10 further comprising an hydraulic fluid reservoir, an electric motor driven hydraulic pump, and a network of hydraulic lines, the network of hydraulic lines interconnecting the first pair of hydraulic rams, the second pair of hydraulic rams, the hydraulic pump, and the hydraulic fluid reservoir.

* * * * *